March 18, 1958 A. F. TOWNSEND 2,826,943
MACHINE TOOL

Filed May 8, 1956 3 Sheets-Sheet 1

INVENTOR.
Almon F. Townsend
BY
Norman S. Blodgett
Attorney

INVENTOR.
Almon F. Townsend

March 18, 1958   A. F. TOWNSEND   2,826,943
MACHINE TOOL

Filed May 8, 1956   3 Sheets-Sheet 3

INVENTOR.
Almon F. Townsend
BY Norman S. Blodgett
Attorney

United States Patent Office 2,826,943
Patented Mar. 18, 1958

2,826,943

MACHINE TOOL

Almon F. Townsend, Worcester, Mass., assignor to The Heald Machine Company, Worcester, Mass., a corporation of Delaware Application May 8, 1956, Serial No. 583,496

10 Claims. (Cl. 77—3)

This invention relates to a machine tool and more particularly to a boring head for the acurate boring of cylindrical internal surfaces and the like.

In the finishing of internal cylindrical surfaces there has been considerable difficulty in performing this type of operation both automatically and accurately. In an automatic boring machine it is conventional practice to set the machine in such a manner that a workpiece is produced that is within tolerance and, then, to leave the machine in that condition; occasionally, a workpiece is checked for size and, when the workpieces begin to run out of size, the machine is stopped and an adjustment made by the operator. There is little opportunity to gage the workpiece during the boring operation and, even if there were, there is not opportunity to stop the operation at a given bore diameter, since the cut is usually made in one pass. Attempts have been made to design a boring tool which can be adjusted in response to a signal from an after gage, i. e., a device which measures the workpiece when the workpiece has been ejected from the machine. Such prior art devices have been complicated and expensive and have failed to attain a desirable accuracy and reliability. The disadvantages of the previously-known apparatus of this kind have been obviated by the present device in a novel manner.

It is therefore an outstanding object of the invention to provide a machine tool having a rotating material-removing point which may be accurately adjusted radially of the axis of rotation during the said rotation.

Another object of this invention is the provision of a boring tool which may be adjusted relative to the axis of rotation during operation.

A still further object of the present invention is the provision of an adjustable boring bar which may be actuated in response to a signal from an after-gage.

It is another object of the instant invention to provide a tool for use in an automatic boring machine in which adjustments of the tool are made in response to a gage which measures each workpiece as it leaves the machine after the boring operation has been completed.

A still further object of the invention is the provision of a boring tool capable of automatic radial adjustment and of axial retraction movement.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which.

Figure 1:
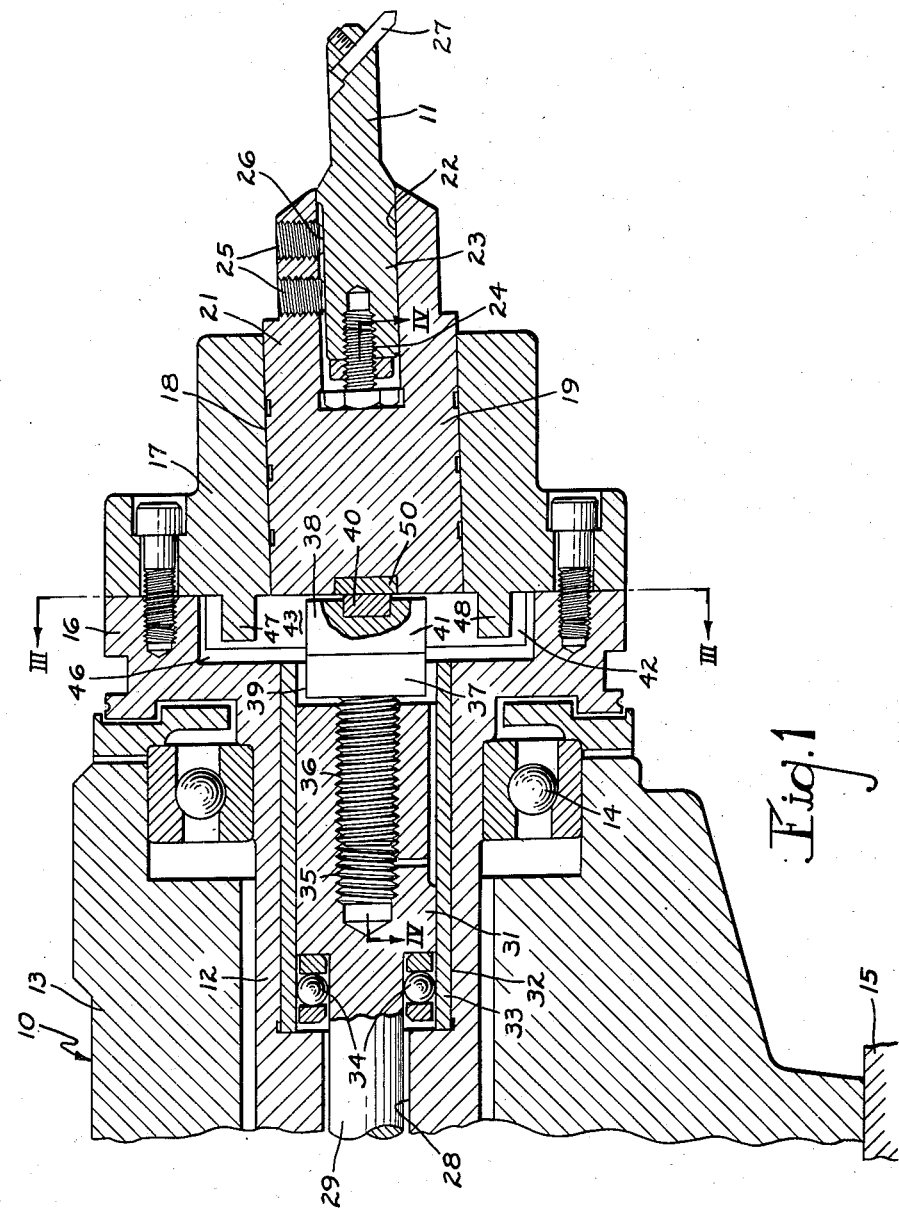
Figure 1 is a sectional view of a portion of a machine tool embodying the principles of the present invention.
Figure 2:
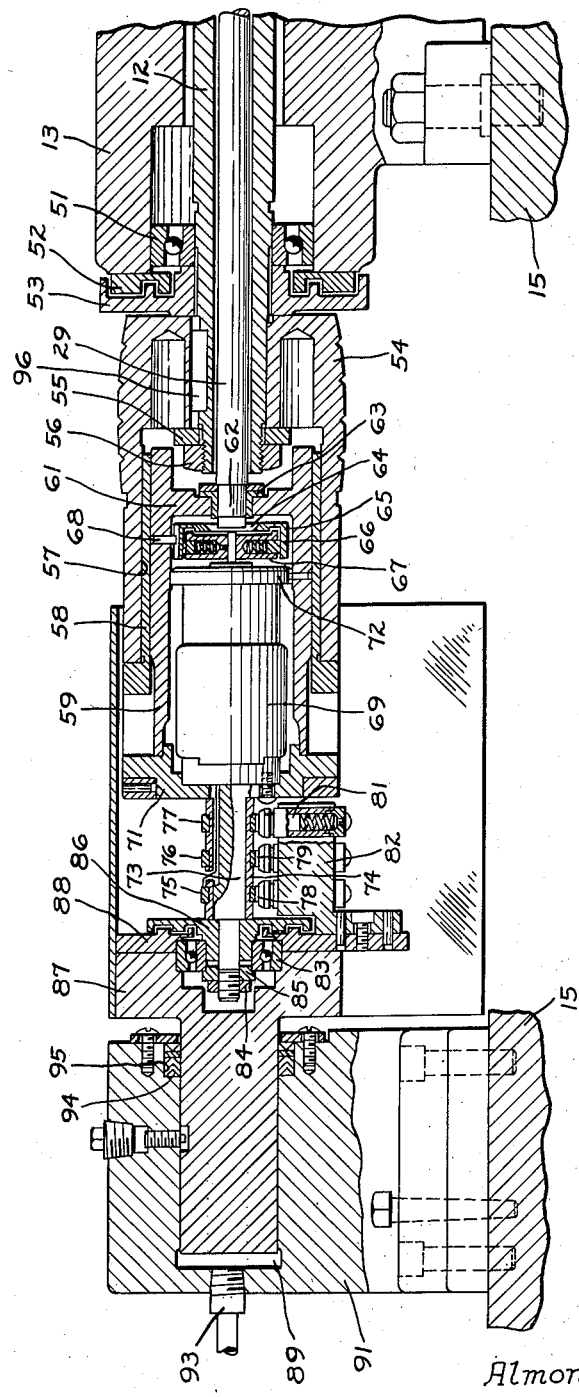
Figure 2 is a sectional view of another portion of the tool.
Figure 3:
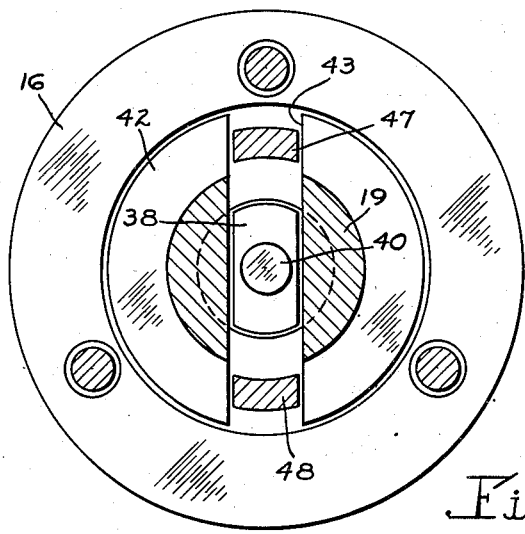
Figure 3 is a sectional view of the tool taken on the line III—III of Figure 1.

Referring first to Figures 1 and 2, wherein are best shown the normal features of the invention, the machine tool, designated generally by the reference numeral 10, is shown as a boring head having a cutting element 11, mounted on a main shaft 12 which, in turn, is rotatably mounted in a main block 13. For the purposes of this specification, the expression "longitudinal" is used to indicate a direction parallel to the axis of rotation of the shaft 12, while the expression "transverse" is used to denote a direction at a right angle thereto. The shaft 12 extends through the block 13 and outwardly thereof at each end; the end that is connected to the cutting element 11 is designated herein as the "workpiece" end and is shown in Figure 1; the other end, shown in Figure 2, is designated as the "drive" end. The block 13 is mounted on the bed 15 of a boring machine of the general type shown and described in the patent to Schmidt et al., No. 2,146,446 for sliding movement toward and away from a workpiece, not shown.

Referring particularly to Figure 1 at the workpiece end, the shaft 12 is mounted in the block by means of a ball bearing 14. Externally of the block, the shaft is provided with an enlarged head 16 formed with surfaces which match the surface of the block in that area, so that a rotating labyrinth seal is formed. The side of the head facing away from the block is provided with a flat radial surface to which is bolted a cap 17 having a bore 18 which is generally aligned with the axis of the shaft 12, but which, more specifically, has a centerline which lies at a small angle to and intersecting the axis of the shaft. Within this bore lies a cylindrical portion 19 at one end of an elongated holder 21. A bore 22 enters the other end of the holder and extends axially of the cylindrical portion throughout a considerable portion of the length of the holder. The cutting element 11 has an elongated cylindrical portion 23 that lies within the bore 22; one end lies adjacent the bottom of the bore 22 and is provided with a bolt 24 which makes the length of the holder adjustable so that it always fits snugly against the back of the bore. Set screws 25 extend through the holder into the bore and press against a flat 26 milled on the element 11. The other end of the cutting element 11 extends outwardly of the holder, is enlarged, and has mounted therein a cutter 27 of the usual type.

Figure 4:
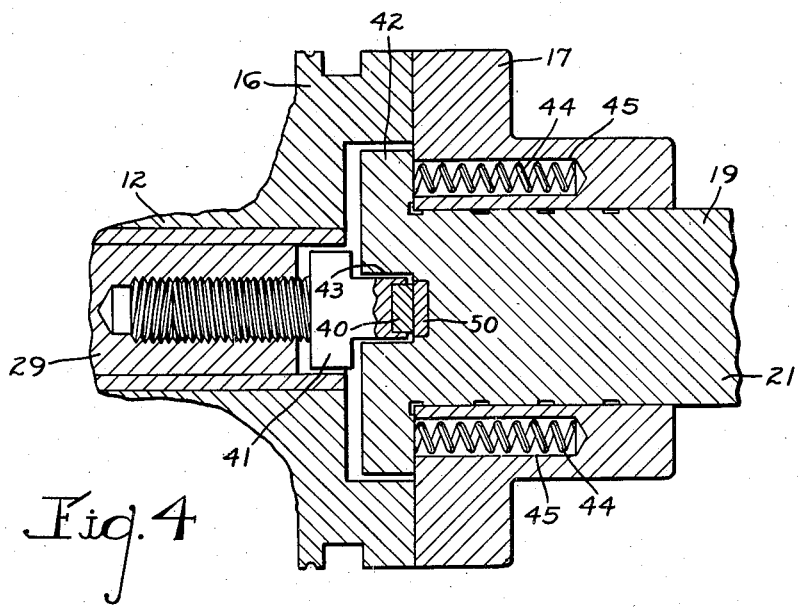
Figure 4 is a sectional view of the tool taken on the line IV—IV of Figure 1.

A bore 28 extends through the shaft 12 and within this bore lies an adjusting rod 29. The workpiece end of the rod has an enlarged cylindrical head 31 residing within a counterbore 32 in the shaft 12. A hardened steel liner sleeve 33 is pressed into the counterbore and rotative and axial movement is permitted between the inner surface of this sleeve and the head 31 of the adjusting rod. The axial movement is limited by a ball thrust bearing 34 located between the rod and the sleeve 33. Entering the workpiece end of the rod 29 is a threaded bore 35, whose threads have a very fine lead; in this bore lies the threaded shank 36 of an actuating member 37 having an enlarged head 38; the head is provided with a cylindrical portion 39 located adjacent the shank and usually within the sleeve 33. The head also has a portion 41 of rectangular cross-section, the workpiece end of which is provided with a hardened steel or carbide button 49 which engages a similar button 50 on the holder 21. As is best evident in Figure 4, the cylindrical portion 19 of the holder is formed with a circular flange 42 having a slot 43 in which the rectangular portion 41 of the actuating member resides. Coil springs 44 reside in bores 45 in the cap 17 and press outwardly against the flange 42. A counterbore 46 in the head 16 of the shaft 12 receives the flange 42 which is limited in its longitudinal movement to the confines of the enclosure formed by the counterbore and the cap 17. The shaft 12, the rod 29, the sleeve 33, the shank 36, and the counterbore 46 are all coaxial. Fingers 47 and 48 extend rearwardly from the cap 17 and reside snugly in the slot 43 above and below, respectively, the actuating member 37.

As is apparent in Figure 2, the drive end of the shaft 12 is rotatably mounted at the drive of the block 13 in a ball bearing 51. A sealing member 52 is bolted to the block, while another sealing member 53 surrounds the shaft and locks the inner race of the bearing 51 in place. The sealing members are provided with mating surfaces which form a labyrinth seal. A pulley 54 overlies the shaft next to the sealing member 53; the pulley is locked against rotation relative to the shaft 12 by a key 96. The pulley and the sealing members are clamped together against the block by a washer 55 and a nut 56 which is threaded on the end of the shaft. The pulley 54 is provided with a large internal bore 57 in which is fitted a hardened steel sleeve 58. Within this sleeve and extending therefrom is slidably mounted a generally tubular piston 59 having a dividing wall 61 adjacent one end. The adjusting rod 29 has a reduced end 62 extending through the wall 61 and held snugly therein by means of a tight-fitting bushing 63. The extreme end of the rod is flattened and resides in a slot 64 formed in the outer member 65 of a friction clutch 66. The inner member 67 is provided with spring-biased dogs which bear against the inner surface of the outer member and serve to transmit power by friction between the inner and outer members of the clutch. The clutch is held against revolution relative to the piston 59 by means of a pin 68 extending from the piston which contacts a key in the outer member. The inner member of the clutch is fastened to the shaft of a small, powerful, elongated, electric motor 69 which lies longitudinally within the piston and is fastened at the end opposite the shaft to a closure member 71 bolted to the exposed end of the piston. At the shaft end, the motor is provided with a transverse flange 72 which extends outwardly and engages the inner surface of the piston to act as a support. Extending longitudinally from the motor 69 and the closure 71 is a supporting bar 73 on which is mounted a ceramic insulating sleeve 74 on which, in turn, is mounted three copper slip rings 75, 76 and 77. The rings are engaged by resiliently-biased contact brushes 78, 79 and 81 suitably mounted in a ceramic block 82. The end of the supporting bar 73 away from the motor is rotatably mounted in a ball bearing 83 whose inner race is clamped between a nut 84 and washer 85 on one side and a seal member 86 on the other side. The outer race of the bearing 83 is clamped between one end of a piston 87 on one side and another sealing member 88 on the other side. The sealing members 86 and 88 are formed with intricate matching surfaces which form a labyrinth seal. The block 82 is bolted to the sealing member 88. The other end of the piston 87 resides snugly in a bore 89 in a cylinder member 91 which is bolted to the bed 15. Fluid pressure may be admitted through a tube 93 to the bore 89 to move the piston 87 to the right. A chevron seal 94 resides in a counterbore 95 and engages the surface of the piston.

The operation of the invention will now be readily understood in view of the above description. The workpiece, not shown, will be mounted on the bed 15 in the usual manner with the bore to be finished generally aligned with the axis of rotation of the shaft 12. The pulley 54 is driven by the conventional motor and belt, not shown, thereby rotating the shaft 12, the cap 17, the holder 21 and the cutting element 11; in addition, the actuating rod 29, the piston 59, the motor 69 and the supporting bar 73 also rotate with the pulley 54. As the cutting element 11 rotates, carrying the cutter 27 with it, the workpiece is advanced toward the tool and the cutter cuts a cylindrical surface in the bore of the workpiece. Before the cutter enters the bore, however, oil under pressure is introduced into the bore 89 of the cylinder member 91 through the tube 93, thus moving the piston 87 to the right. The piston carries with it the supporting bar 73, the motor 69, the piston 59 and the actuating rod 29, but the sleeve 58, the pulley 54, the shaft 12 and the cap 17 do not partake of this longitudinal movement. The workpiece end of the actuating rod 12 carries the actuating member 37 with it and this last-mentioned member engages the holder 21 and advances it longitudinally within the bore 18 in the cap 17. Since the centerline of the bore 18 is inclined to the axis of rotation of the shaft 12 and, thus, to the centerline of the bore in the workpiece, the cutter 27 is advanced slightly in the radial or transverse direction. The piston 87 is stopped with the cutter 27 in its most advanced position and it is in this position, selected during the setting-up of the machine, that the finishing of the bore in the workpiece takes place.

At the extreme end of the longitudinal feeding stroke of the workpiece, the movement is reversed in the usual manner. At that time, the hydraulic pressure is released from the piston 87 and coil springs 44 (Figure 4) press against the flange 42 of the holder 21 and carry it to the left in the bore 18 in the cap; the actuating rod 29, the piston 59, the motor 69 and the piston 87 are also moved in this direction until the flange strikes the bottom of the counterbore 46. This longitudinal movement of the holder causes the cutter 27 to be drawn inwardly. Then, the workpiece is moved longitudinally on a rapid retraction stroke so that the cutter passes through the bore in the workpiece and outwardly thereof. The cutter does not, of course, engage the surface of the finished bore because of the fact that it has been moved inwardly in the manner described.

When the workpiece has been completely withdrawn from the cutter, it is removed and transferred, preferably automatically, by means, not shown, to an after-gage, not shown, for measurement. The after-gage may be of the type shown and described in the patent application of Townsend, Serial Number 567,785, filed February 27, 1956. If the after-gage finds that the diameter of the finished bore is outside the tolerated range, it makes a correction by impressing an electrical signal on the brushes 78, 79 and 81 in such a manner as to correct the diameters of succeeding workpiece bores. For instance, the bore of a workpiece is too large, an electrical signal is impressed on the brushes 78 and 79 for a short length of time. A timing mechanism built into the after-gage determines this fixed period of time. The shaft 12 and the holder 21 are moved to extended position to the right. The current on the brushes 78 and 79 feeds through the slip rings 75 and 76 and actuates the motor 69. The shaft of the motor rotates and acts through the clutch 66 to rotate the actuating rod 29. At the other end of the rod, the actuating member 37 cannot rotate because its head 38 resides in the slot 43 in the holder 21 which cannot rotate relative to the cap 17 because of the presence of the fingers 47 and 48; the cap, in turn, is bolted to the head 16 of the shaft 12 and the shaft is keyed to the pulley 54 which is restrained by means of its belt drive. The net effect is that the rod 29 rotates relative to the actuating member 37 and the latter feeds longitudinally into the threaded bore 35 of the shaft. The springs 44 move the holder to the left and maintain the buttons 40 and 50 in contact with each other. The holder 21 is moved longitudinally into the bore 18 and the cutter 27 is moved inwardly or transversely a small amount, so that succeeding workpiece bores will be finished with smaller diameters by twice the amount of the inward movement of the cutter. Since the motor is energized for a fixed period of time, as determined by the timer in the after-gage, the cutter will be adjusted in equal increments. It is to be understood that it would be possible to make adjustments of the cutter which are proportional to the amount of error by using an after-gage control of the type shown and described in the patent application of Hatstat, et al, Serial Number 531,659, filed Augst 31, 1955. Adjustments of the cutter to compensate for undersize bores in the workpieces may be made by energizing the brushes 79 and 81 to cause the motor shaft to rotate in the direction opposite that described above, whereupon the cutter 27 will be advanced radially outwardly.

In a specific example of the invention the inclination of the centerline of the bore 18 and the cylindrical portion 19 of the holder 21 to the axis of rotation of the shaft 12 was selected as 2° 15'. The shank 36 of the actuating member 37 was provided with a standard ½"-20 thread. The electric motor 69 has an output shaft speed of 10 revolutions per minute. This meant that the motor revolved once every six seconds and, during that one revolution, the actuating member advanced .050" relative to the rod 29. In one second, it advanced .0083" and, during that second, the cutter moved radially .0083 × tangent of 2° 15'=.0083×.03929=.00033". In other words, if the timing period was selected as one second, the increment of adjustment of the cutter was .00033", producing a change in bore diameter of .00066".

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool comprising a tubular shaft mounted for rotation, a holder mounted on the shaft for rotation therewith and for sliding motion relative thereto in a generally longitudinal direction, the line of sliding being inclined slightly to the axis of the shaft to permit adjustment of the holder radially relative to the axis of the shaft, the holder being adapted to hold a cutter, an actuating rod mounted within the shaft for rotation independently of the shaft, a reversible motor connected coaxially to the rod for rotation thereof, threaded means connecting the rod and the holder to produce the said sliding motion of the holder relative to the shaft to adjust the cutter radially of the axis of the shaft, the said means comprising a screw which engages the actuating rod for axial movement relative thereto and a head which engages the holder for axial movement therewith, and means connecting the head and the holder so that the head does not partake of the radial movement of the holder.

2. A machine tool comprising a tubular shaft mounted for rotation, a holder mounted on the shaft for rotation therewith, the holder being mounted in a bore for sliding motion relative to the shaft in a generally longitudinal direction, the centerline of the bore being inclined slightly to the axis of rotation of the shaft to permit adjustment of the holder radially relative to the axis of the shaft, the holder being adapted to hold a cutter, an actuating rod mounted within the shaft for rotation independently of the shaft, a reversible motor connected coaxially to the rod for rotation thereof, threaded means connecting the rod and the holder to produce the said sliding motion of the holder relative to the shaft to adjust the cutter radially of the axis of the shaft, the said means comprising a screw which engages the actuating rod for axial movement relative thereto and a head which engages the holder for axial movement therewith, and means connecting the head and the holder so that the head does not partake of the radial movement of the holder.

3. A machine tool comprising a tubular shaft mounted for rotation, a holder mounted on the shaft for rotation therewith and for sliding motion relative thereto in a generally longitudinal direction, the line of sliding being inclined slightly to the axis of the shaft to permit adjustment of the holder radially relative to the axis of the shaft, the holder being adapted to hold a cutter, an actuating rod mounted within the shaft for rotation independently of the shaft, a reversible motor connected coaxially to the rod for rotation thereof, an actuating member threadedly connected to the rod for axial movement relative thereto and connected to the holder for axial movement therewith and transverse sliding motion relative thereto, the said member serving to produce the said sliding motion of the holder relative to the shaft to adjust the cutter radially of the axis of the shaft.

4. A machine tool comprising a tubular shaft mounted for rotation, a holder mounted on the shaft for rotation therewith, the holder also being mounted in a bore for sliding motion relative to the shaft in a generally longitudinal direction, the centerline of the bore being inclined slightly to the axis of rotation of the shaft to permit adjustment of the holder radially relative to the axis of the shaft, the holder being adapted to hold a cutter, an actuating rod mounted within the shaft for rotation independently of the shaft, a reversible motor connected coaxially to the rod for rotation thereof, and an actuating member threadedly connected to the rod for axial movement relative thereto and connected to the holder for transverse motion relative thereto, the said member serving to produce the said sliding motion of the holder relative to the shaft to adjust the cutter radially of the axis of the shaft.

5. A machine tool comprising a tubular shaft mounted for rotation, a holder mounted on the shaft for rotation therewith and for sliding motion relative thereto in a generally longitudinal direction, the line of sliding being inclined slightly to the axis of the shaft to permit adjustment of the holder radially relative to the axis of the shaft, the holder having an outer end adapted to hold a cutter, an actuating rod mounted within the shaft for rotation and longitudinal reciprocation independently of the shaft, threaded means connecting the rod and the holder to produce the said sliding motion of the holder relative to the shaft, a reversible rotary motor connected to the rod to rotate it and to cause the threaded means to produce the said sliding motion of the holder and to move its outer end at a relatively low rate of speed for adjustment radially of the axis of the shaft, means including slip rings for controlling the energization of the said motor, and a linear motor for bringing about longitudinal motion of the rod to produce the sliding motion to cause the cutter to move at a relatively high rate of speed to and from an operative position.

6. A machine tool comprising a tubular shaft mounted for rotation, a holder mounted on the shaft for rotation therewith, the holder being mounted in a bore for sliding motion relative to the shaft in a generally longitudinal direction, the centerline of the bore being inclined slightly to the axis of rotation of the shaft to permit adjustment of the holder radially relative to the axis of the shaft, the holder having an outer end adapted to hold a cutter, an actuating rod mounted within the shaft for rotation and longitudinal reciprocation independently of the shaft, threaded means connecting the rod and the holder to produce the said sliding motion of the holder relative to the shaft, a reversible rotary motor connected to the rod to rotate it and to cause the threaded means to produce the said sliding motion of the holder and to move its outer end at a relatively low rate of speed for adjustment radially of the axis of the shaft, means for controlling the energization of the said motor, and a linear motor for bringing about longitudinal motion of the rod to produce the sliding motion to cause the cutter to move at a relatively high rate of speed from an operative position to an inoperative position.

7. A machine tool comprising a tubular shaft mounted for rotation, a holder mounted on the shaft for rotation therewith and for sliding motion relative thereto in a generally longitudinal direction, the line of sliding being inclined slightly to the axis of the shaft to permit adjustment of the holder radially relative to the axis of the shaft, the holder having an outer end adapted to hold a cutter, an actuating rod mounted within the shaft for rotation and longitudinal reciprocation independently of the shaft, an actuating member threadedly connected to the rod and connected to the holder for transverse sliding motion relative thereto, the said member serving to produce the said sliding motion of the holder relative to the shaft, a reversible rotary motor connected to the rod to rotate it and to cause the threaded means to produce the said sliding motion of the holder and to move its outer end at a relatively low rate of speed for adjustment radially of the axis of the shaft, means for controlling the energization of the said motor, and a linear motor for bringing about longitudinal motion of the rod to produce the sliding motion to cause the cutter to move at a relatively high rate of speed from an operative position to an inoperative position.

8. A machine tool comprising a tubular shaft mounted for rotation, a holder mounted on the shaft for rotation therewith, the holder also being mounted in a bore for sliding motion relative to the shaft in a generally longitudinal direction, the centerline of the bore being inclined slightly to the axis of rotation of the shaft to permit adjustment of the holder radially relative to the axis of the shaft, the holder having an outer end adapted to hold a cutter, an actuating rod mounted within the shaft for rotation and longitudinal reciprocation independently of the shaft, an actuating member threadedly connected to the rod and connected to the holder for transverse motion only relative thereto, the said member serving to produce the said sliding motion of the holder relative to the shaft, a reversible rotary motor connected to the rod to rotate it and to cause the threaded means to produce the said sliding motion of the holder and to move its outer end at a relatively low rate of speed for adjustment radially of the axis of the shaft, means for controlling the energization of the said motor, and a linear motor for bringing about longitudinal motion of the rod to produce the sliding motion to cause the cutter to move at a relatively high rate of speed from an operative position to an inoperative position.

9. A machine tool as recited in claim 8, wherein the rotary motor is a reversible electric motor and the means for controlling the energization serves to energize it for rotation in a selected direction.

10. A machine tool as recited in claim 8, wherein the linear motor includes a piston, cylinder and means for introducing hydraulic fluid under pressure to the cylinder.

References Cited in the file of this patent

UNITED STATES PATENTS

| | | |
|---|---|---|
| 1,794,080 | Longley | Feb. 24, 1931 |
| 1,893,810 | Travis | Jan. 10, 1933 |
| 2,383,050 | Esson | Aug. 21, 1945 |